J. M. FEDDERS.
RADIATOR.
APPLICATION FILED NOV. 10, 1917.

1,295,142.

Patented Feb. 25, 1919.

Inventor,
John M. Fedders
by Geyer & Topff
Attorneys.

UNITED STATES PATENT OFFICE.

JOHN M. FEDDERS, OF BUFFALO, NEW YORK, ASSIGNOR TO FEDDERS MANUFACTURING COMPANY, INC., OF BUFFALO, NEW YORK, A CORPORATION OF NEW YORK.

RADIATOR.

1,295,142.    Specification of Letters Patent.    Patented Feb. 25, 1919.

Application filed November 10, 1917. Serial No. 201,191.

*To all whom it may concern:*

Be it known that I, JOHN M. FEDDERS, a citizen of the United States, residing at Buffalo, in the county of Erie and State of New York, have invented new and useful Improvements in Radiators, of which the following is a specification.

This invention relates to a radiator for gas engines and the like in which the core comprises a plurality of water conducting tubes arranged parallel side by side and a plurality of radiating members arranged in the spaces between adjacent tubes and contacting therewith so as to assist in carrying away the heat from the water which is to be cooled.

The object of this invention is to produce a radiator of this character which is strong and durable in construction, which is capable of being readily and easily manufactured and which requires a minimum amount of metal considering the radiating efficiency which is secured.

The invention forming the subject of this application is an improvement on the radiator unit shown and described in Letters Patent of the United States granted July 16, 1918, #1,272,646.

Figure 1:
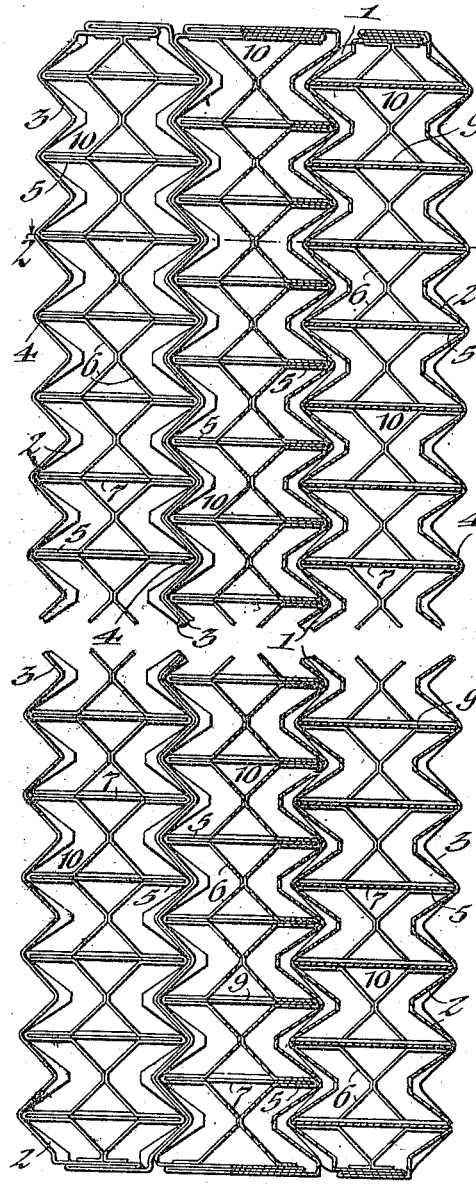
Figure 2:
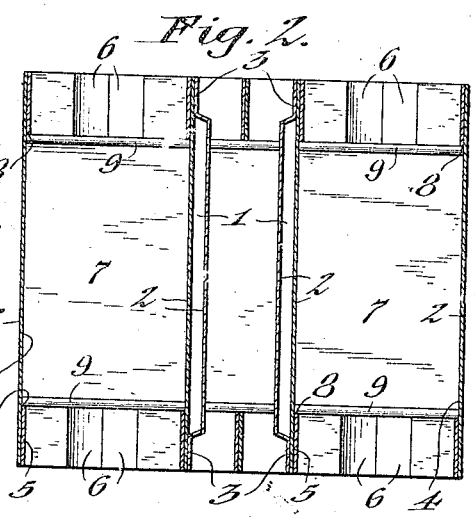
Figure 3:
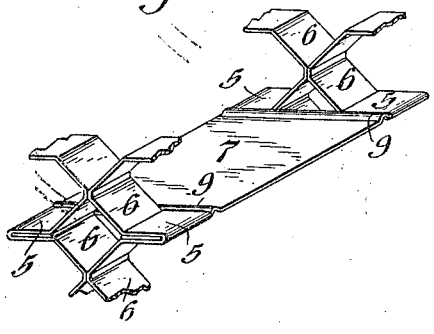
Figure 4:
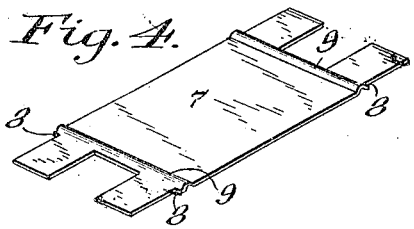

In the accompanying drawings:

Figure 1 is a fragmentary front elevation, partly in section, of a radiator core constructed in accordance with my invention. Fig. 2 is a horizontal section taken on line 2—2 Fig. 1. Fig. 3 is a fragmentary perspective view of one of the radiating members arranged between a pair of adjacent water tubes. Fig. 4 is a similar view of one of the plates forming part of one of the radiating members.

Similar characters of reference refer to like parts throughout the several views.

1 represents a plurality of water tubes through which the water to be cooled is circulated, for instance, the water of the cooling system of a gas engine. These water tubes are arranged parallel side by side with an intervening space between adjacent water tubes and each tube is preferably constructed of two corrugated strips or sheets 2 of metal which form the outer walls of this tube. At their opposite longitudinal edges these tube walls are provided with off-sets 3 which engage each other and are united by solder. The several water tubes are so assembled that the external valleys or bottoms 4 of the corrugations of one wall are arranged opposite or in line with the external bottoms or corrugations on one wall of an adjacent water tube.

Between every two adjacent water tubes is arranged a radiating member containing my invention, the same in its preferred form being constructed as follows:

At the front and rear ends of the space between a pair of adjacent water tubes in line with the longitudinal edge portions of these tubes are arranged supports or supporting members which form part of the respective radiating member. Each of these supports comprises two sections each of which is constructed of a strip of sheet metal so as to form a plurality of pairs of plaits 5 which are arranged parallel and in a longitudinal row and a plurality of webs 6 alternating with said plaits. The plies of each plait are connected together at their outer ends and each web is connected at one of its ends with the inner end of one ply of one plait, and at its opposite end with one ply of an adjacent plait of the same strip. The central part of each web is bent inwardly and engages with a correspondingly inwardly bent similar part of a web of the companion supporting strip. The outer edges of the plaits of two supporting strips engage with corresponding pairs of bottoms or valleys on the opposing walls of two adjacent water tubes. 7 represents a plurality of transverse plates of sheet metal which are arranged in a longitudinal row between adjacent water tubes. Each of these plates is seated at its opposite ends in corresponding pairs of plaits of the several longitudinal supporting strips and the width of these plates is preferably such that the same engages its side edges with the corresponding bottoms or valleys of two adjacent corrugated tube walls. At its opposite ends each of the transverse plates is preferably provided with a notch or recess 8 of a width equal to the space between the inner ends of a corresponding pair of plaits of two companion supporting strips. Endwise displacement of these plates relatively to the supporting strips on which the same are mounted is preferably prevented by providing each of these plates with a transverse stop, bead or rib 9 which engages with the inner sides of a pair of supporting strips.

After the several members of a radiator core have been thus assembled the front and rear sides of the same are dipped in solder so as to secure the tube walls to each other and the supporting strips and transverse plates to each other and to the tube walls.

A radiator thus constructed produces a cellular appearance when viewed from either side thereof and forms a plurality of air passages 10 between adjacent water tubes which assists in carrying away the heat from the water which is circulated through the tubes.

By removing the metal from the front and rear ends of the radiating plates in forming the notches 8 the radiating members not only require less metal but they also avoid the appearance of a line or bridge across the space between a pair of opposing webs of a pair of supporting strips and in actual use give the appearance of square cells bounded by the webs of a pair of supporting strips.

This construction of radiating members can be produced at comparatively low cost inasmuch as the same can be readily assembled and on account of the bracing effect which is obtained by their use between adjacent water tubes, a very strong and durable radiating core is produced which will stand up under the severest use which the radiator is liable to encounter when installed on an automobile or elsewhere.

I claim as my invention:

1. A radiator comprising a radiating member having two longitudinal end supports, each of which consists of a pair of strips of sheet metal, each strip comprising a plurality of parallel plaits and plurality of webs alternating with said plaits, the plies of each pair of plaits being connected together at their outer ends and each web being connected at one of its ends with the inner end of one ply of one plait and at its opposite end with one ply of an adjacent plait of the same strip and a plurality of transverse plates each engaging its opposite ends with corresponding pairs of plaits of said longitudinal supports.

2. A radiator comprising a radiating member having two longitudinal end supports, each of which consists of a pair of strips of sheet metal, each strip comprising a plurality of parallel plaits and plurality of webs alternating with said plaits, the plies of each pair of plaits being connected together at their outer ends and each web being connected at one of its ends with the inner end of one ply of one plait and at its opposite end with one ply of an adjacent plait of the same strip and the central part of each web being bent inwardly and engaging the correspondingly inwardly bent central part of a web of the companion supporting strip, and a plurality of transverse plates each seated at its opposite ends in corresponding pairs of plaits of said longitudinal supports.

3. A radiator comprising a radiating member having two longitudinal end supports, each of which consists of a pair of strips of sheet metal, each strip comprising a plurality of parallel plaits and a plurality of webs alternating with said plaits, the plies of each pair of plaits being connected together at their outer ends and each web being connected at one end of its ends with the inner end of one ply of one plait and at its opposite end with one ply of an adjacent plait of the same strip and the central part of each web being bent inwardly and engaging the correspondingly inwardly bent central part of a web of the companion supporting strip, and a plurality of transverse plates each seated at its opposite ends in corresponding pairs of plaits of said longitudinal supports and provided at its ends with notches which are arranged opposite the spaces between the corresponding pairs of plaits of said supports.

4. A radiator comprising a radiating member having two longitudinal end supports, each of which consists of a pair of strips of sheet metal, each strip comprising a plurality of parallel plaits and a plurality of webs alternating with said plaits, the plies of each pair of plaits being connected together at their outer ends and each web being connected at one of its ends with the inner end of one ply of one plait and at its opposite end with one ply of an adjacent plait of the same strip and a plurality of transverse plates each engaging its opposite ends with corresponding pairs of plaits of said longitudinal supports and a plurality of parallel water tubes having corrugated walls, the valleys of adjacent walls engaging with the outer ends of the plaits of said longitudinal supports.

5. A radiator comprising a radiating member having two longitudinal end supports, each of which consists of a pair of strips of sheet metal, each strip comprising a plurality of parallel plaits and a plurality of webs alternating with said plaits, the plies of each pair of plaits being connected together at their outer ends and each web being connected at one of its ends with the inner end of one ply of one plait and at its opposite end with one ply of an adjacent plait of the same strip and a plurality of transverse plates each engaging its opposite ends with corresponding pairs of plaits of said longitudinal supports and a plurality of parallel water tubes having corrugated walls, the valleys of adjacent walls engaging with the outer ends of the plaits of said longitudinal supports and also with the side edges of said plates.

6. A radiator comprising a radiating member having two longitudinal end supports, each of which consists of a pair of strips of sheet metal, each strip comprising a plurality of parallel plaits and a plurality of webs alternating with said plaits, the plies of each pair of plaits being connected together at their outer ends and each web being connected at one of its ends to the inner ends of one ply of one plait and at its opposite end with one ply of an adjacent plait of the same strip and a plurality of parallel water tubes having corrugated walls, the valleys of the corrugations of adjacent walls being arranged opposite each other and engaging the outer edges of the plaits of said longitudinal supports.

JOHN M. FEDDERS.